United States Patent [19]

Shaikh

[11] Patent Number: 4,546,300
[45] Date of Patent: Oct. 8, 1985

[54] ELECTRIC POWER SUPPLY CONNECTION FOR SUBMERSIBLE CAPACITOR-START MOTOR APPARATUS

[75] Inventor: Maqboolhusein G. Shaikh, Troy, Ohio

[73] Assignee: A. O. Smith Corporation, Milwaukee, Wis.

[21] Appl. No.: 476,116

[22] Filed: Mar. 17, 1983

[51] Int. Cl.$^4$ .............................................. H02P 1/42
[52] U.S. Cl. ..................................... 318/786; 310/71; 310/87; 417/422; 138/89
[58] Field of Search ............................ 318/785–787; 310/71, 87; 174/52 PE; 417/422; 138/89, 109

[56] References Cited

U.S. PATENT DOCUMENTS

| | | | |
|---|---|---|---|
| 3,248,582 | 4/1966 | Brown | 310/71 |
| 3,457,866 | 7/1969 | Komor | 310/87 |
| 3,457,867 | 7/1969 | Komor | 310/87 |
| 3,604,964 | 9/1971 | Conrad et al. | 310/71 |
| 3,631,275 | 12/1971 | Conrad et al. | 310/71 |
| 3,644,810 | 2/1972 | Lewus | 318/787 |
| 3,761,750 | 9/1973 | Green | 310/87 |
| 4,015,633 | 4/1977 | Mandell | 310/87 |
| 4,272,714 | 6/1981 | Vind | 318/788 |
| 4,297,627 | 10/1981 | Schaefer | 318/785 |
| 4,387,313 | 6/1983 | Yamamoto | 310/71 |

*Primary Examiner*—David Smith, Jr.
*Attorney, Agent, or Firm*—Andrus, Sceales, Starke & Sawall

[57] ABSTRACT

An oil-filled submersible capacitor-start induction motor for operating a submersible pump includes an integrated capacitor/switch unit releasably secured to the lower end. The motor includes an outer tubular shell with spaced radial rotor bearings and with the housing extending downwardly of the lower bearing to an end bell. A diaphragm unit is secured to the end bell to balance the well pressure and internal oil pressure. The upper end cap includes a three-wire connector to receive a two-wire or a three-wire power cable. The lower end bell is generally cup-shaped and has a three pin connector. The capacitor/switch unit includes a sealed cylindrical housing which fits in the motor end and includes the capacitor and a triac connected to a three-terminal connector including capacitor terminals and a gate terminal. A sealing plug is adapted to be releasably attached to the bottom connector. The sealing plug includes a shorting clip connecting the capacitor terminals and thereby connecting the motor winding to the top connector to receive a three-wire cable with a capacitor and switch at the upper end of the motor. The capacitor/switch unit may be formed as a relatively thin, elongated unit located above the motor-pump unit within the well and incorporated directly into the power cable with a two-wire plug-in connection to the power cable and a three-wire output to the motor. A donut-shaped capacitor may also be mounted within the motor adjacent the stator winding and a triac mounted on the capacitor and hardwired in circuit.

3 Claims, 12 Drawing Figures

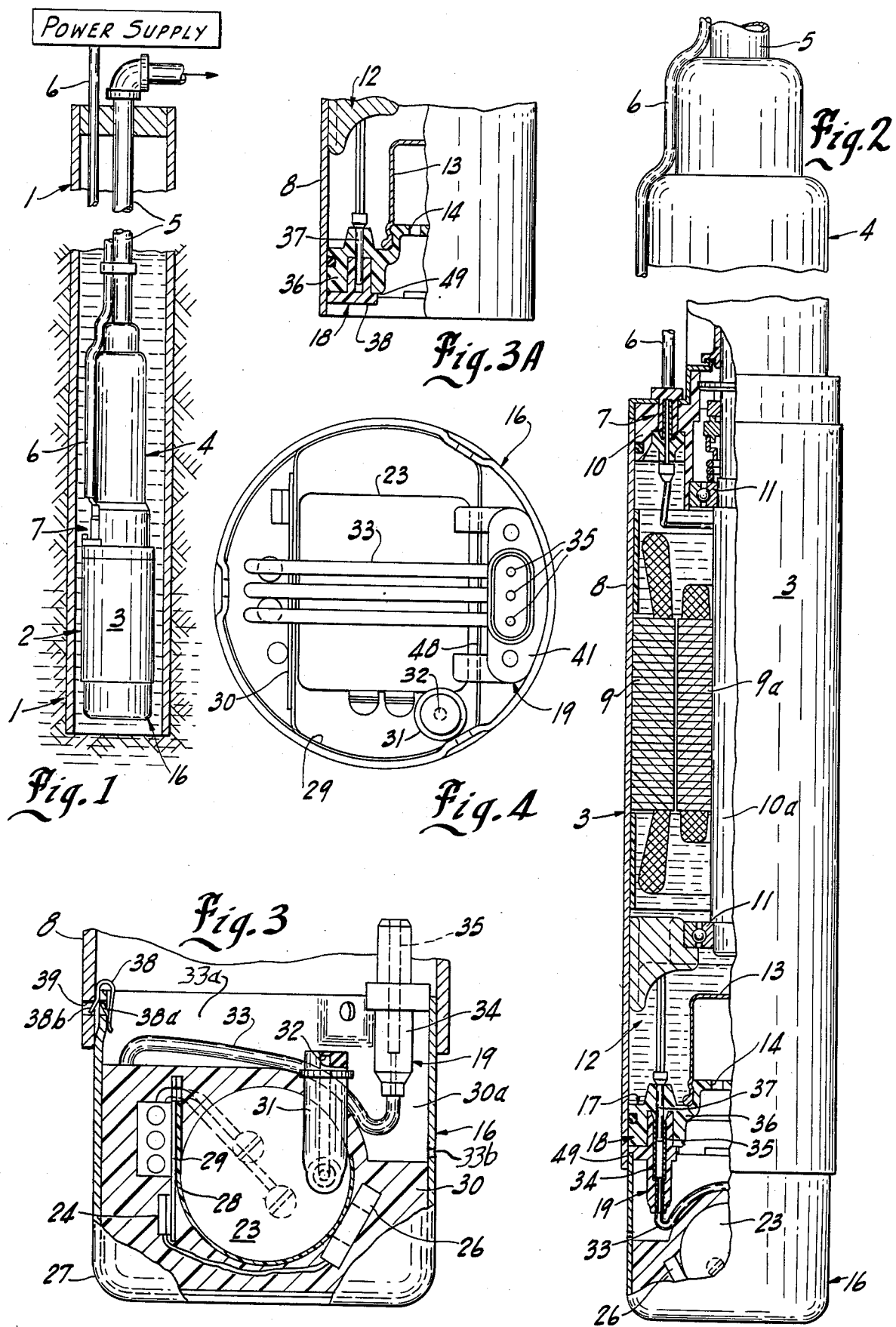

ELECTRIC POWER SUPPLY CONNECTION FOR SUBMERSIBLE CAPACITOR-START MOTOR APPARATUS

BACKGROUND OF THE PRESENT INVENTION

This invention relates to a submersible single phase capacitor-start, induction motor and particularly a capacitor-start induction motor having a capacitor connected in circuit with a start winding only during the starting.

Submersible motors are widely used for pumping of water and other liquids. A significant usage of submersible motor is in domestic deep drilled water wells in which the well is drilled to a depth of hundreds of feet into the ground. A submersible motor-pump unit is supported immersed within the well by the discharge piping. The submersible motor-pump unit includes an elongated motor with a pump unit secured to the upper end thereof. Power lines are dropped down through the well casing and connect the motor to the power supply through a suitable control to provide for selective motor operation and pumping of water from the well. Each time the motor starts, it must operate the pump to initiate flow, lifting the water from the well upwardly through the piping. A relatively heavy starting load is created and the submersible motor must be constructed with a corresponding high starting torque. A well known and convenient method to create high starting torque in a single phase motor is to provide a separate start circuit branch which includes a starting winding in series with a capacitor to establish a phase shifted magnetic field which increases the starting torque. When the motor approaches or reaches operating speed, the torque requirements drop significantly. Conventionally, a speed responsive switch means is provided to disconnect the starting branch circuit and the motor continues to operate as a single phase induction motor.

Various systems have been provided for physically locating the capacitor at the upper end of the well casing or as an integrated part of the motor. If the capacitor is located as an integrated part of the motor, a two-wire supply cable is connected to the motor. If the capacitor is located at the upper end of the well, a three-wire supply cable is required. The motor is preferably constructed to operate as either a two-wire or a three-wire motor unit to permit manufacture and inventory of a single basic design. This of course requires some form of a releasable interconnection of the capacitor to the motor unit. Various suggestions have been made. For example, U.S. Pat. No. 3,604,964 discloses a submersible motor-pump unit having a capacitor releasably mounted within a separate end member attached to the lower end of the motor. The lower end of the motor proper is further provided with a releasable electrical connector having a motor component or part connected to the windings and a separate part connected to leads which extend downwardly and are connected to the inner end of the capacitor. If the motor is to be operated as a two-wire motor, the capacitor is suitably secured to the motor and the two lead wires connected to the upper end of the motor. The two wires supply power to the motor with the internal connections provides for the connection of the capacitor into the circuit. In at least one embodiment, the above patent also suggests a voltage responsive electromagnetic relay be provided within the lower capacitor housing. The relay winding is energized at a predetermined voltage to open the contacts and thereby disconnect the start branch. The opening of the contacts results in arcing which may create various practical adverse effects which prevent commercial implementation. To operate the motor as a three-wire motor, the capacitor unit is disconnected from the motor. A three-wire cable is connected to power and a remote capacitor and to the motor to supply power to the motor and simultaneously provide separate connection of a remotely located capacitor in the start branch. The internal centrifugal switch automatically disconnects the start branch at the appropriate speed as the motor reaches or approaches normal operating speed.

A generally similar system is disclosed in U.S. Pat. No. 3,457,867 wherein the capacitor unit is secured to the lower end of the motor. A separate cable member connects the capacitor unit to a single motor connector at the upper end of the motor for appropriate interconnection to the incoming power supply cable. In this instance, the motor can be operated as a three-wire supply with an external capacitor, in which event the integrated capacitor is not connected to the motor. U.S. Pat. No. 4,297,627 discloses a motor having an internal wired cutout switch unit with an external plug-in connection adapted to receive a capacitor unit to operate as a capacitor-start motor or a shorting plug to operate as a split phase motor. Other patents which similarly show selective connection for two wire or three wire motor operation are shown in the following U.S. Pat. Nos. 2,032,129; 3,248,582; 3,350,585; 3,420,974; 3,457,866; 3,631,275; 3,761,750.

Although the various submersible motor systems have provided satisfactory operating functional and operating characteristics, submersible pump motor units are relatively expensive and have a limited life. Further, the capacitor and switching system may fail and simple replacement of just such components will provide an extended operating life of the submersible motor-pump unit. There is a need therefore for a relatively simple construction of a two/three-wire motor having a reliable switching means and a long life capacitor and switching means.

SUMMARY OF THE PRESENT INVENTION

The present invention is particularly directed to a submersible capacitor-start induction motor for operating a submersible pump unit or the like and to an integrated capacitor and solid state gated switch assembly adapted to be located within the well at the motor location. The capacitor and gated switch are connected in a series branch with the gate connected to the motor windings for operation at a desired switching speed. In one unique embodiment, a capacitor/switch unit includes a capacitor and a gated switch housed in a potted assembly which is removably mounted and integrated as a motor attachment. The capacitor/switch unit has an external three terminal connector adapted to be coupled to a motor connector and, the motor has a motor power connector for receiving either a two or three wire cable. In accordance with a preferred embodiment of the present invention, the submersible motor includes an elongated tubular housing having a lower cup-shaped end. One part of a two part releasable connector is secured within the lower end of the motor and is connected to the motor windings, including a three terminal means connected and adapted to connect a capacitor and a solid state gated switch into circuit with the windings. The capacitor and switch unit include a housing releasably connected to the lower end of the motor housing. The capacitor unit is a sealed integrated unit including an appropriate start capacitor means connected in series with a solid state gated switch means to a pair of connector terminals at the motor end of the housing. In addition, the gated switch has a gate connected to a third terminal of the connector for connecting to the motor windings which provide a turn-on signal to the gate for connecting the capacitor into the circuit during the initial starting of the motor and automatically removing the gate signal as the motor reaches the capacitor disconnect speed. The capacitor and solid state switch circuit are potted within the housing having an upper free chamber within which the capacitor/switch unit connector part and leads are accommodated. The potted combined capacitor and solid state unit provides a highly reliable and long life structure which can be conveniently operated within the hostile environment of a deep well. The unit is readily coupled and decoupled to the motor for convenient replacement. When the two-wire mode is not to be used, a connector part is connected to the capacitor connector and includes a shorting conductor to connect the motor leads and the windings into circuit with the power connector for connection to the capacitor through the upper end motor connector and to seal the third terminal, with the connector sealed to prevent shorting of the leads by the well liquid.

The sealed capacitor and solid state switch unit may, within the broadest aspect of the invention, be otherwise formed and connected into circuit. In another embodiment the capacitor/switch unit are formed as a relatively thin, elongated unit adapted to be located within the well casing adjacent the discharge pipe. The switch/capacitor unit is incorporated directly into the power cable, with a two-wire input to the power cable and a three-wire output to the motor. The switch/capacitor unit includes a sealed potted housing. The input connection preferably includes a releasable plug-in type connector on the first end of the housing. The three-wire output extends through the second end of the housing and preferably terminates in a three-wire plug-in type connector for a releasable connection to the motor. In still a further embodiment, the capacitor and solid state switch are incorporated directly into the stator assembly. In this embodiment, the capacitor is a donut-shaped unit adapted to be mounted in aligned adjacent positioning with the stator winding and sealed within the motor. The capacitor and gated switch including the gate electrode are hard wired to the motor windings. The solid state switch is readily constructed as a sealed unit and is therefore particularly adapted to incorporation into the motor structure located within the well.

More particularly in accordance with a preferred construction of the present invention, an oil-filled submersible motor includes a stator unit and rotor unit suitably mounted within an outer tubular shell with an upper sealed bearing structure and a lower radial bearing structure secured within the housing. The housing extends downwardly or outwardly of an inner bearing and is sealed by an end bell member. A diaphragm unit is secured to the end bell member and is coupled by an opening in the end bell, such that the opposite sides of the diaphragm balance the well and internal oil pressure in accordance with known construction and establishes a pressurized state of the oil within the motor to prevent leakage of water into the motor. The upper end cap includes a power cable connector adapted to receive either a two-wire or a three-wire power cable for appropriate application of power to the motor depending upon its connection as a two-wire or a three-wire motor. The lower end bell is an outwardly opening cup-shaped member. A multiple pin connector is secured in the end cap to the one side of the diaphragm. A sealed start capacitor/switch canned unit includes a sealed cylindrical housing of a diameter essentially corresponding to the diameter of the motor. The one end of the housing is reduced to fit in the motor end and includes the capacitor and a solid state starting switch. A three-terminal connector is provided on the reduced end of the capacitor housing and includes two terminal means connected to the opposite ends of the series connected capacitor and a gated switch, and a third terminal means is connected to the gate of the switch. Clamping means project through the shell into clamping engagement with the inner end of the canned unit to firmly and releasably secure it in place with the proper power connections. The canned unit and motor end bell are spaced to form a chamber passage to connect the chamber to the exterior of the motor, and subject the diaphragm to the well water to pressurized the motor oil.

The present invention provides a compact and long life capacitor/switch unit particularly adapted for a submersible motor-pump unit located within a deep well.

DESCRIPTION OF THE DRAWING FIGURES

The drawings furnished herewith illustrate a preferred construction of the present invention in which the above advantages and features are clearly disclosed as well as others which will be readily understood from the following description.

In the drawings

FIG. 1 is a simplified vertical section of a well unit incorporating a motor-pump assembly illustrating an embodiment of the present invention;

FIG. 2 is an enlarged side view of the motor-pump unit shown in FIG. 1, with parts broken away and sectioned;

FIG. 3 is a further enlarged view of the sealed capacitor switch unit shown in FIGS. 1 and 2, with parts broken away and sectioned;

FIG. 3a is a fragmentary view illustrating the motor with the capacitor/switch unit shown in FIG. 2 removed;

FIG. 4 is a top view of FIG. 3 with potting material removed;

FIG. 6 is a plan view of the plug unit shown in FIG. 3a;

DESCRIPTION OF THE ILLUSTRATED EMBODIMENT

Figure 5:
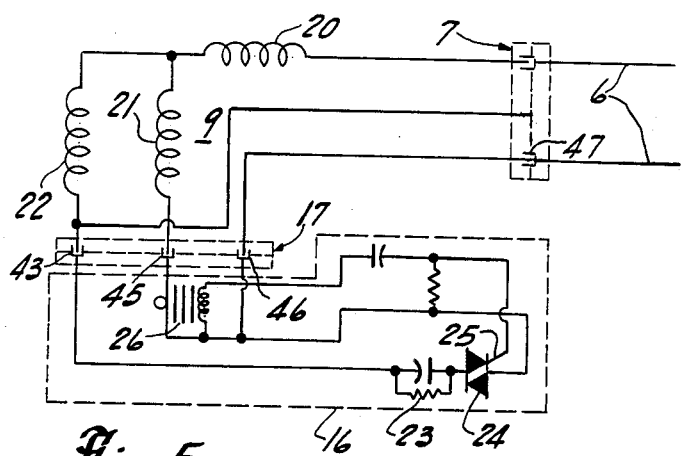
FIG. 5 is a schematic circuit diagram of the motor with a start capacitor/switch unit as shown in FIGS. 1-4.

Referring to the drawings and particularly to FIG. 1, a drilled well is illustrated having a casing 1 which lines the well opening in the ground, extending downwardly into the ground and into the water table. A submersible motor-pump unit 2 is located within the well 1 and is submersed in the water. The motor-pump unit 2 includes a lower motor 3 with a pump 4 secured to the upper end of the motor 3 and driven thereby. A motor-pump support and water discharge pipe 5 is secured to the upper end of the pump 4 and extends upwardly and out of the well 1, which is suitably sealed to prevent leakage into the well in accordance with conventional practice. A power cable 6 is attached to the motor 3 and dropped into the well therewith. In accordance with general practice, the cable 6 is strapped to the discharge pipe 5. Cable 6 extends past the pump 4 and plugs into the motor 3 with a fluid-tight type connector 7 to provide power to the motor 3, such as shown in the copending application of the present inventor entitled "Power Connection Apparatus Having Integrated Surge Arrestor Means and Particularly Adapted for Submersible Motors and The Like," filed on even date herewith.

The motor 3 is a suitable alternating current induction motor of a capacitor start construction which includes a run winding circuit and a separate start winding circuit, as more fully discussed hereinafter. Generally, as shown in FIG. 2, the motor 3 includes an outer, elongated housing or shell 8. An annular stator 9 is secured therein, with a rotor 9a rotatably mounted in alignment within the stator 9. The upper end of the motor is closed by an end frame 10 having a sealed rotary bearing therein rotatably supporting the motor shaft 10a. The shaft 10a of course extends through the sealed bearing assembly and is coupled to the pump impellor shaft, not shown. The opposite and lower end of the motor shaft 10a is supported by a radial bearing 11 secured within the shell 8 adjacent the lower end of the stator 9. The motor 3 is shown as an oil-filled motor and the shell 8 extends downwardly from the bearing 11 to define an oil resevoir in the bottom of the motor. A lower end cap or frame 12 is secured within the lower end of the shell 8 to seal the shell in spaced relation to the lower radial bearing 12. An oil bag 13 is secured to the end frame 12 and projects inwardly into the oil resevoir or chamber. The frame 12 is provided with openings 14 subjecting the exterior of the diaphragm 13 to the well water pressure. The motor 3 is filled with oil and is pressurized when lowered into the well. The oil-filled motor, in accordance with known structures, is desirable in that leakage, if any, will be from the motor.

The motor 3 is a capacitor-start type motor and a capacitor and a cutout switch are provided for connection in the start winding circuit. A capacitor and a switch unit may be provided at the upper end of the motor and connected into circuit through a suitable three-wire cable. Alternatively, a capacitor/switch unit 16 is shown releasably interconnected to the lower end of the motor 3. The capacitor/switch unit 16 is electrically interconnected to the stator winding 9 by a releasable connector assembly 17 including a motor part 18 formed in the end frame 12 and a capacitor/switch part 19 affixed to the unit 16.

Thus, referring particularly to FIG. 5, a schematic illustration of a typical single phase capacitor start motor 3 is illustrated. The stator winding 9 includes a pair of run windings 30 and 21 interconnected to the incoming power leads 6. A separate start winding 22 is also connected in circuit with the windings 20–21. Winding 22 is connected in series with a start capacitor 23 and a solid state gated switch 24 which are housed and form a part of the separate capacitor/switch unit 16. The circuit is more fully disclosed in the copending application of Robert H. Douthart and Howard W. Smityh, entitled "Capacitor-Start Induction Motor," which was filed on October, 1982. Generally, gated switch 24 is illustrated as a solid state thyristor or triac and normally is non-conducting to hold the start winding de-energized. The thyristor, in accordance with known construction, includes a gate 25 connected by a capacitive coupling and pulse current transformer 26 to connector 19 for connection to the circuit of the motor winding. The initial power connection to the run windings 20–21 also provide power to the thyristor 24 to conduct and supply current to the start winding. As the running speed is approached, the winding current is significantly reduced thereby reducing the gate signal. At a select speed, the gate signal is operatively removed and the thyristor opens, thereby disconnecting the capacitor from circuit. The motor continues to run as a conventional single phase capacitor-start induction motor.

The present invention is particularly directed to provision of the capacitor 23 and solid state gated switch 24 as an integrated capacitor/switch unit 16 for appropriate connection to the stator windings 20–21 at the motor 3 by location of the unit 16 at the motor, and to the motor construction which permits connection to the capacitor and switch unit at the top motor connector 7 or at the bottom connector 12, both of which are three terminal connectors.

In the illustrated embodiment of the invention in FIGS. 1–4, the capacitor/switch unit 16 includes an outer generally cup-shaped construction housing or shell 27 having an outer diameter essentially corresponding to the interior diameter of the motor housing or shell 8. The housing 27 is conveniently formed as a drawn shell from a suitable metal, such as stainless steel. The open end of the housing 27 is thus adapted to be directly telescoped into extended end of the shell 8. The relatively large electroylic capacitor 23 is located within the housing 27 within an insulator 28. The switch 24 is secured to a circuit board and support plate 29 which is located within the housing abutting the one wall of the insulator 28. The housing 27 is filled with a suitable insulating plastic 30, such as an epoxy, to cover and encapsulate the switch 24 and associated circuit components on the board and the capacitor 23 and thereby provide a highly effective liquid tight seal over the circuit and its components. The encapsulated assembly is located within the base portion of the cup-shaped housing or can 28 with a free space 30a in the upper or open end of the housing. The encapsulated unit of course completely seals the capacitor unit. In the event of various malfunctions, the capacitor may create a pressurized gaseous condition which may eventually erupt with an explosive state. In the preferred construction, a tubular sealed vent 31 is coupled to the capacitor 23 and projects therefrom through the potting material 30 into the free space 30a. Thus, the illustrated vent 31 is an L-shaped rubber tube member having an end sealed by a suitable integral rubber closure 32. If a dangerous condition is created, the closure 32 ruptures to permit escape of the gases and thereby eliminates a potential damaging state. The outer housing 27 may be provided with a small drain hole 33b for insuring removal of water after factory testing.

The capacitor and gate leads 33 extend outwardly from the respective encapsulated elements within the open end of the housing 27. The flexible leads terminate in the movable plug-in type connector part 19.

The connector part 19 is a standard type of a plug-in member, which is shown of a socket construction. More particularly, part 19 includes an insulating body 34 which extends outwardly of the outer edge of the housing 27. Three terminal sockets 35 are located within the body 34 in aligned, side-by-side relationship.

The motor end frame 12 includes the connector part 18. The end frame connector part 18 includes insulating body 36 having a complementing recess adapted to receive the socket body 34. Three terminal pins 37 are arranged in a side-by-side array within body 36 corresponding to that of the sockets 35 in capacitor connector body 34. The effective engagement of the sockets and pins establishes the electrical connection of the capacitor 23 and the gate 25 of start switch 24 directly into the circuit, as shown in FIG. 5.

In the illustrated embodiment, the capacitor switch housing 27 projects into the motor shell 8. The unit 16 is secured in place by equicircumferentially distributed attachment means 38. Although any means, such as a simple screw and threaded opening, may be used, the means 38 is preferably a special hair-pin or V-shaped clip 38 adapted to be projected over the edge of the module shell or housing 27. The inner clip arm includes a projection 38a which engages an opening in the shell 27 to secure it in place. The outer arm of clip 38 has its outer end bent outwardly as at 38b. When the module is inserted with the clip 38 in place, the end 38b passes through an opening 39 in the extension of the motor housing 8 and firmly releasably connects the capacitor/switch housing 27 to the motor shell 8.

In operation, the capacitor/switch unit 16 is connected to the lower end of motor 3. The power cable 6 is connected to the motor connection 7 at the top of the motor and the motor-pump assembly 12 with attached power cable 6 is lowered into the well 1. Once secured in position and ready to operate, power is supplied via the two-lead cable 6 to the motor 3. This simultaneously supplies power to the running winding 20-21 and simultaneously to the gate 25 of the controlled switch 24. The switch 24 conducts to also supply power to winding 22 in series with capacitor 23 and the submersible motor starts as a capacitor-start motor. As the motor approaches running speed, the voltage signal applied to the gate 25 drops and at a selected speed drops below the level to turn on the gated switch 24. The switch 24 therefore turns off and disconnects the start capacitor 23 and winding 22 from the motor winding circuit and the motor 3 continues to run as a conventional induction motor.

Figure 6:
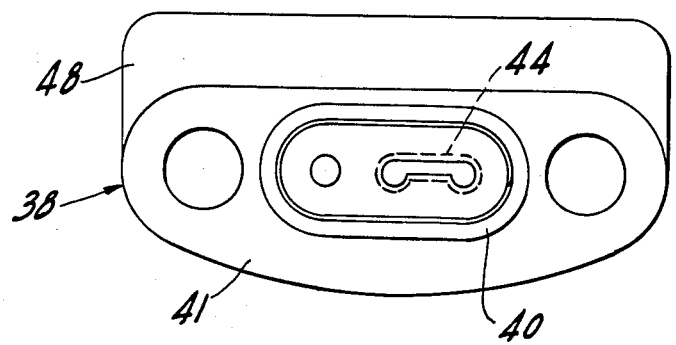
Figure 7:
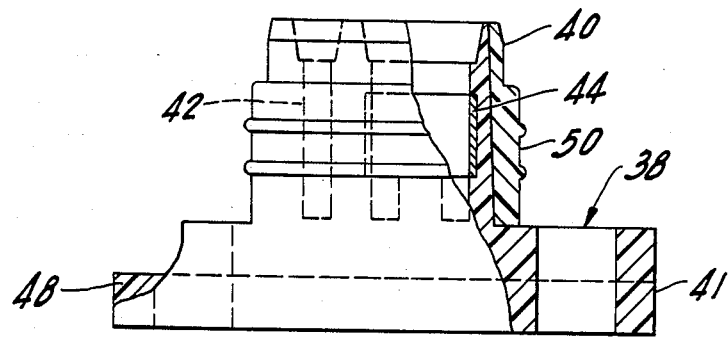
FIG. 7 is a side view of FIG. 6.

If it is desired to operate the motor as a three-wire motor with a remote capacitor and switch unit, the capacitor unit 16 is disassembled from the motor 3. An insulating plug and shorting unit 38 is affixed to the motor connector part 18 and seals the same against the well water, as shown in FIG. 3a. The plug and shorting unit 38 includes a synthetic rubber body 40 (FIGS. 3a, 6 and 7) adapted to be inserted in the motor socket 18 and having outer mounting and sealing plate or flange 41. The unit 38 is bolted to the motor end cap 12, as shown in FIG. 3a to provide a liquid tight cover over the motor connector port 18. The plug and shorting unit 38 includes a blank opening 42 adapted to mate with the start winding pin 43 of the motor connector part 18. An adjacent dual socket metal clip 44 is aligned with the other two motor pins 45 and 46 of connector part 18. The clip 44 directly connects the two engaged pins 45-46 and thus serves as an electrical shorting member to connect the run winding to a power terminal 47 of the top motor connector 7. The unit 38 also includes a directional control lateral ear or flange 48 projecting from mounting flange 41. Flange 48 engages the end of motor shell 8 if the plug unit 38 is mounted in the wrong direction and insures proper mounting of the plug unit 38 for shorting of the motor terminals 45-46. The flange 41 is adapted to abut an encircling sealing face 49 on the bottom of the end cap 12 surrounding the motor socket 18, as shown in FIG. 2. The flange 41 includes end bolt openings on its opposite ends for receiving the clamping bolts. The plug-in unit 38 is preferably formed of a hard body having a sealing boot 50 adapted to be compressed within the motor socket to form a firm long-life sealed connection.

Figure 5A:
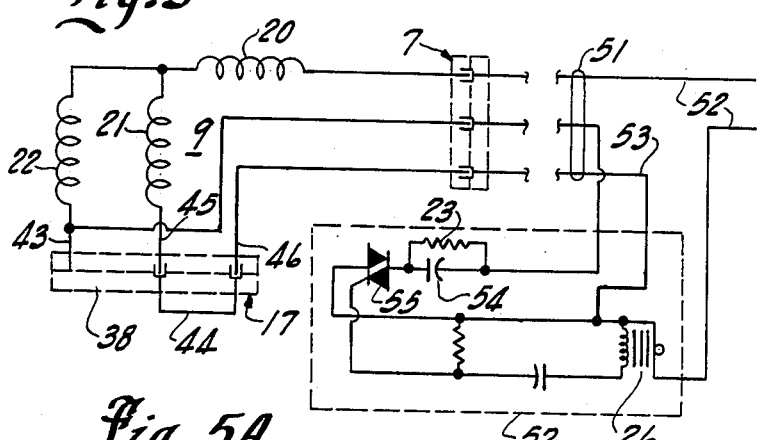
FIG. 5a is a schematic circuit with the capacitor/switch unit removed.

With plug unit 38 in place, a three-wire cable 51 is coupled to the motor 3 at the top connector 7, as schematically shown in FIG. 5a.

In the three-wire cable connection, a remote capacitor and switch unit 52 is provided and connected into the motor circuit at the upper end of the well 1. Thus, the power cable includes a pair of power lines 52 and a switch control lead 53 supplying power to the windings in circuit with a capacitor 54 and also supplying a gate signal to the switch 55. The motor circuit is thus identical to that produced by connecting of the canned capacitor and solid state unit 16 to the lower end of the motor and supplying power through a two wire cable. Plug 38 connects the nonwinding lead directly to the top motor connector part. The capacitor/switch assembly for both the potted lower unit and the above ground unit are shown as being identical, and in fact the identical circuit board is preferably used for both connections. In the above ground unit, the capacitor and circuit board may of course be potted or otherwise secured in a typical circuit box for convenient mounting in a power connecting support assembly.

The present invention thus provides a reliable and effective means of providing an integrated capacitor/switch unit at the motor.

Although preferably formed as an integrated unit and coupled to the lower end of the motor, an integrated capacitor/switch unit can be secured to the opposite end of the motor, or even be made a part of the drop cable.

Figure 8:
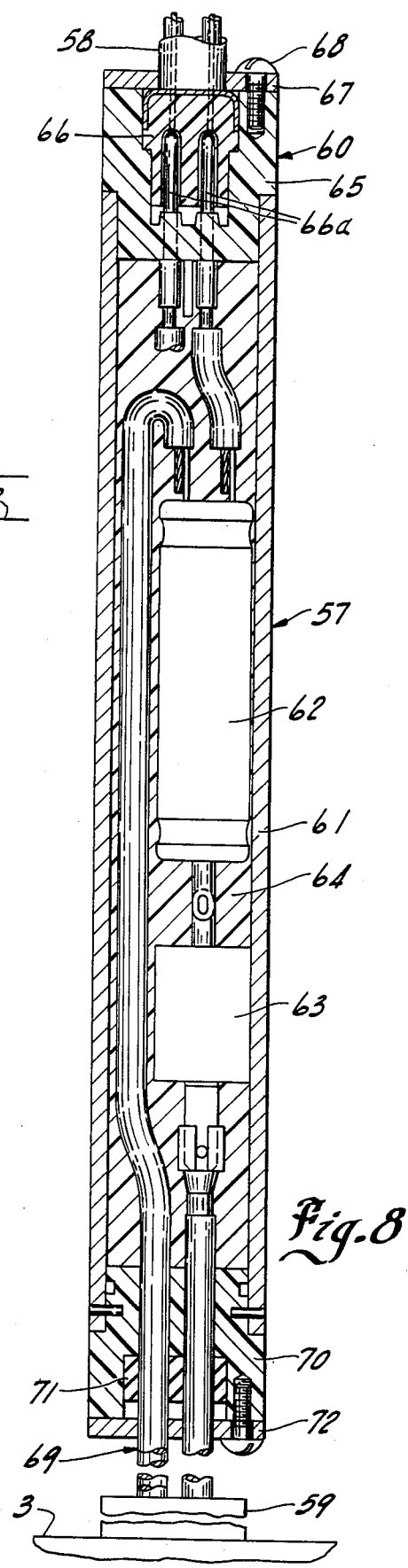
FIG. 8 is a side elevational view of an alternate embodiment showing a top located capacitor unit.
Figure 9:
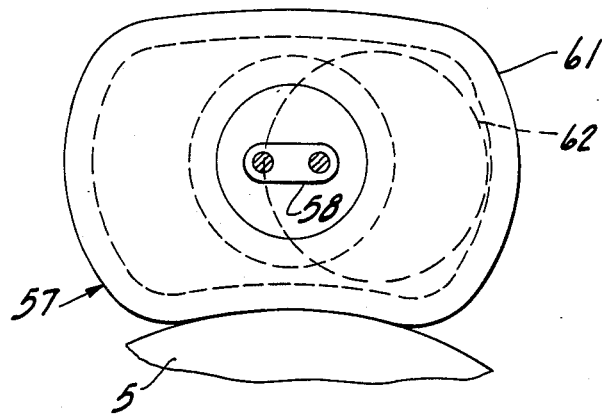
FIG. 9 is an end view of the capacitor unit shown in FIG. 8.

FIGS. 8 and 9 show a submersible motor embodiment wherein a separate capacitor/switch unit 58 is connected into and forms an integrated portion of the lower end of a two-wire cable 58. The unit 57 is shown as a separate plug-in type connected assembly having opposite ends of the unit formed as releasable connection means including a three-wire motor connection 59 to the submersible motor 3 and a two-wire connection 60 to the bottom end of cable 58.

The motor 3 may be constructed in the same manner as the motor of the first embodiment and is thus adapted to be powered from a three-wire cable, with the lower unit connection sealed as by the plug and shorting unit 38.

The capacitor/switch unit 57 includes an outer casing 61 of an elongated tubular construction which is adapted to be readily located between the drop pipe 5 and the well casing 1. An elongated, electroytic capacitor 62 is mounted within the tubular housing or casing 61 and connected in series with a solid state switch 63. The series connected capacitor 62 and switch 63 are embedded within a suitable potting material 64 within the housing 61, with the power leads and the gate lead extending therefrom.

The connection to the incoming cable 58 is preferably through a plug-in type connector 60. Thus, the outer end of the housing 61 is sealed or closed by an insulating block 65. Contact pins 66 are embedded within the block 65 and extend into a recess within the block. The recess is adapted to receive a cable plug 66 having terminal sockets located in the arrangement of the pins. The cable connector plug 66 is clamped in place by a suitable clamping plate 67 firmly affixed in overlying relationship to the plug member and secured to the end block by a plurality of cap screws 68. The connection of the plug 66 provides a power connection from the two leads of cable 58 to the capacitor and switch within the unit 57. The leads are connected to the capacitor and switch with three output leads for connection to the motor 3.

The three output leads 69 project through the opposite end of housing 61 and in particular through a closure block 70 firmly affixed in sealed relation to the opposite end of the housing. The block 70 is recessed and filled with a resilient sealing gasket 71. A cap 72 is secured to the housing block 70 by suitable cap screws and compress the sealing gasket about the leads to produce a liquid tight end closure.

The leads 69 extend from the unit 57 and are of a sufficient length to extend over and past the pump and terminate at the outer end in connector 59 to the motor 3.

In operation, the capacitor/switch unit 57 is coupled to the two-wire cable 58 by the releasable connector 60 and to the motor 3 by the plug-in motor connector 59. The motor/cable assembly is of course made prior to placing the motor into the well and the assembly is then lowered into the well with the capacitor/switch unit 57 located immediately adjacent to the motor-pump unit and in abutting engagement with the pipe 5. The capacitor/switch unit 57 is preferably formed with a generally rectangular housing 61 having a slight arcuate shape, as more fully shown in FIG. 9, for convenient abutment against the discharge pipe.

The combination of the capacitor 62 and the solid state switch 63, as previously noted, permits the convenient location in an adverse environments, as shown in FIGS. 1-9.

Further, where the motor is designed with an internal control switch, the separate elongated potted unit may be further modified to include only the capacitor potted within the elongated housing with the appropriate two-wire top connection and three lower connection.

Figure 10:
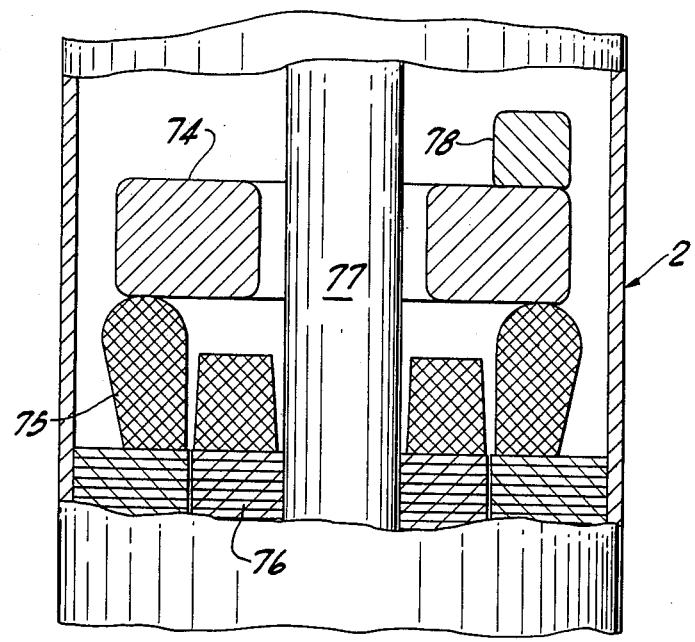
FIG. 10 is a fragmentary view of a submersible motor illustrating a further capacitor/switch unit mounting within a submersible motor.

FIG. 10 is a fragmentary sectional view of a submersible motor showing a further mounting of such a combination of a capacitor and a gated solid state switch. A donut-shaped or annular capacitor 74 is mounted abutting the end of an annular stator winding 75 and the rotor 76 and encircling the rotor shaft 77. A solid state switch 78, such as a thyristor, is secured to the end face of the capacitor 74 and thus is located within the motor compartment. The switch 78 and capacitor 74 are thus affixed to the stator windings and become an integrated part of the motor.

The present invention is thus particularly directed to and provides improvement in the practical implementation of the art of capacitor-start single-phase submersible motors in which both two-wire and three-wire power supply cables may be encountered and particularly to an improved system for providing an elective capacitor start unit therefore.

Various modes of carrying out the invention are contemplated as being within the scope of the following claims, particularly pointing out and distinctly claiming the subject matter which is regarded as the invention.

I claim:

1. A submersible motor-pump apparatus having a vertical operating position with the pump above the motor and adapted to be operated from a two-wire power supply or a three-wire power supply, comprising a submersible motor, an integrated capacitor and switch unit adapted to be secured to said motor to form an integrated part of the submersible motor and operable submersed in a well, a three terminal connector means including a first part connected to the bottom of said motor and a second part connected to said capacitor unit, said first and second parts located and held in operative circuit completion engagement with said capacitor and switch unit mounted to said motor, said capacitor and switch unit including a sealed housing having said second connector part mounted in the outer portion thereof and in sealed relation to maintain a fluid tight enclosure, a capacitor within said housing, a solid state gated switch located within said housing, said solid state gated switch being connected in series with said capacitor in a start branch and including a triggered gate means, said second connector part including first and second terminal members connected to the opposite ends of said start branch and having a seperate third terminal member connected to said gate means, whereby said start branch circuit is connected in series with said start winding and said gate means is connected to sense the current flow in the motor run winding to automatically disconnect said start branch in response to a predetermined motor speed, a second three-terminal connector means secured to the upper end of said motor and having three terminals connected to said motor and adapted to be connected to a two-wire supply or to a three wire supply, and a shorting plug adapted to be coupled to said first connector part with said three wire supply connection to said motor, a potting material in said housing encapsulating said capacitor and said switch, said capacitor being subject to malfunction and generating an abnormal pressure within said potting material and said potting material including a releasably sealed vent opening extending from said capacitor to the exterior of said housing, a pressure responsive seal means in said vent opening operable to withstand the pressure in said well and responsive to a pressure created by capacitor malfunction to open said vent opening.

2. The submersible motor-pump apparatus of claim 1 wherein said submersible motor includes a dish-shaped end frame having a central portion spaced from the exterior wall of said motor and including a pressurizing diaphragm secured to the central portion and exposed to the surrounding well liquid and to the liquid in said motor, said dished end frame opening outwardly, said capacitor unit including an end section adapted to closely fit within the sidewall of said dish-shaped end frame and having an outer diameter defining an extension of said submersible motor, said first part of said connector means being secured within the end from outwardly of said central portion.

3. The apparatus of claim 4 wherein said motor including an annular stator unit, said stator winding wound a core within said stator unit and projecting from the opposite ends thereof, a rotor located within the stator unit, and end bearing cap secured to the one end of said stator unit and including bearing means rotatably supporting said rotor in said stator unit with said rotor shaft extending through the first bearing cap, a second bearing unit secured to the opposite end of said stator unit in inwardly spaced relation to the end of the housing to rotatably support the opposite end of the rotor, oil filling said closed stator unit and rotor chamber to immerse said stator winding and rotor in oil, pressurized diaphragm means maintaining said oil under pressure whereby leakage into stator unit is prevented, an end sealing cap secured to the lower end of the stator housing in outwardly spaced relation to said second bearing start unit and inwardly of the lower end of the stator housing, attachment means releasably attaching said capacitor unit to the second bearing cap as an extension of said stator unit, and a passageway means in said second bearing cap transmitting in the surrounding environment to the exterior of said diaphragm pressurized means with said capacitor and switch unit attached to said stator unit.

* * * * *

UNITED STATES PATENT AND TRADEMARK OFFICE
CERTIFICATE OF CORRECTION

PATENT NO. : 4,546,300
DATED : October 8, 1985
INVENTOR(S) : MAQBOOLHUSEIN G. SHAIKH It is certified that error appears in the above-identified patent and that said Letters Patent is hereby corrected as shown below:

Column 4, Line 25, Cancel "pressurized" and substitute therefor ---pressurize---

Column 5, Line 44, Cancel "resevoir" and substitute therefor---reservoir---

Column 5, Line 48, Cancel "resevoir" and substitute therefor ---reservoir---

Column 6, Line 46, Cancel "electroylic" and substitute therefor ---electrolytic---

Column 9, Line 4, Cancel "electroylic" and substitute therefor ---electrolytic---

Column 9, Line 53, Cancel "an"

Column 11, Line 5, Cancel "4" and substitute therefor
Claim 3.    ---1---

Signed and Sealed this

Sixth Day of May 1986

[SEAL]

Attest:

DONALD J. QUIGG

Attesting Officer    Commissioner of Patents and Trademarks